(12) United States Patent
Belling

(10) Patent No.: US 7,577,109 B2
(45) Date of Patent: Aug. 18, 2009

(54) METHOD AND APPARATUS FOR SELECTING USER DATA

(75) Inventor: Thomas Belling, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 164 days.

(21) Appl. No.: 10/576,207

(22) PCT Filed: Sep. 24, 2004

(86) PCT No.: PCT/EP2004/052300

§ 371 (c)(1),
(2), (4) Date: Apr. 17, 2006

(87) PCT Pub. No.: WO2005/039139

PCT Pub. Date: Apr. 28, 2005

(65) Prior Publication Data

US 2007/0002775 A1    Jan. 4, 2007

(30) Foreign Application Priority Data

Oct. 16, 2003 (DE) .............................. 103 48 208

(51) Int. Cl.
*H04L 12/16* (2006.01)
*H04Q 11/00* (2006.01)

(52) U.S. Cl. .................. 370/260; 370/352; 370/353; 370/354; 370/355; 370/356

(58) Field of Classification Search ......... 370/352–356, 370/260
See application file for complete search history.

(56) References Cited

OTHER PUBLICATIONS

Rosenberg et al, "An Offer/Answer model with the session Description Protocol (SDP)", Jun. 2002.*
Camarillo G et al: "Early Media and Ringing Tone Generation in the Session Initiation Protocol" Internet Draft, 'Online! Jun. 29, 2003, pp. 1-12, XP002319329 found on the internet: URL: hhtp://www.watersprings.org/pub/id/draft-camarillo-sipping-early-media-02.txt.
Rosenberg J: "SIP Early Media" Internet Draft, 'Online! Jul. 13, 2001, pp. 1-23, XP002319330 found on the internet: URL: hhtp://www.watersprings.org/pub/id/draft-rosenberg-sip-early-media-00.txt.
Quinn B et al.: "Session Description Protocol (SDP) Source Filters" Internet Draft, 'Online! May 15, 2003, pp. 1-10, XP002319331 found on the internet: URL: hhtp://www.watersprings.org/pub/id/draft-ietf-mmusic-sdp-srcfilter-05.txt.
Handley, M., et al., "SDP: Session Description Protocol", Network Working Group, Request for Comments: 2327, 1998, pp. 1-42.
Rosenberg, J., "Unifying Early Media, Manyfolks, and HERFP", Internet Engineering Task Force, Jan. 17, 2002, pp. 1-36.
Garcia, M., et al., "3GPP requirements on SIP", Network Working Group, Mar. 2002, pp. 1-37.
Handley, M., et al., "SIP: Session Initiation Protocol", Network Working Group, Request for Comments: 2543, Mar. 1999, pp. 1-42.

* cited by examiner

*Primary Examiner*—Quynh H Nguyen
(74) *Attorney, Agent, or Firm*—Staas & Halsey LLP

(57) ABSTRACT

A method selects user data that is transmitted between a calling user and at least one called user via at least one telecommunication network before call establishing is complete. The calling user uses a called user's reception address data contained in a reply message of a called user to select user data sent by the called user with a transmission address of said called user, a called user's reception address data of a call destination also representing transmission address data of said called user.

13 Claims, 1 Drawing Sheet

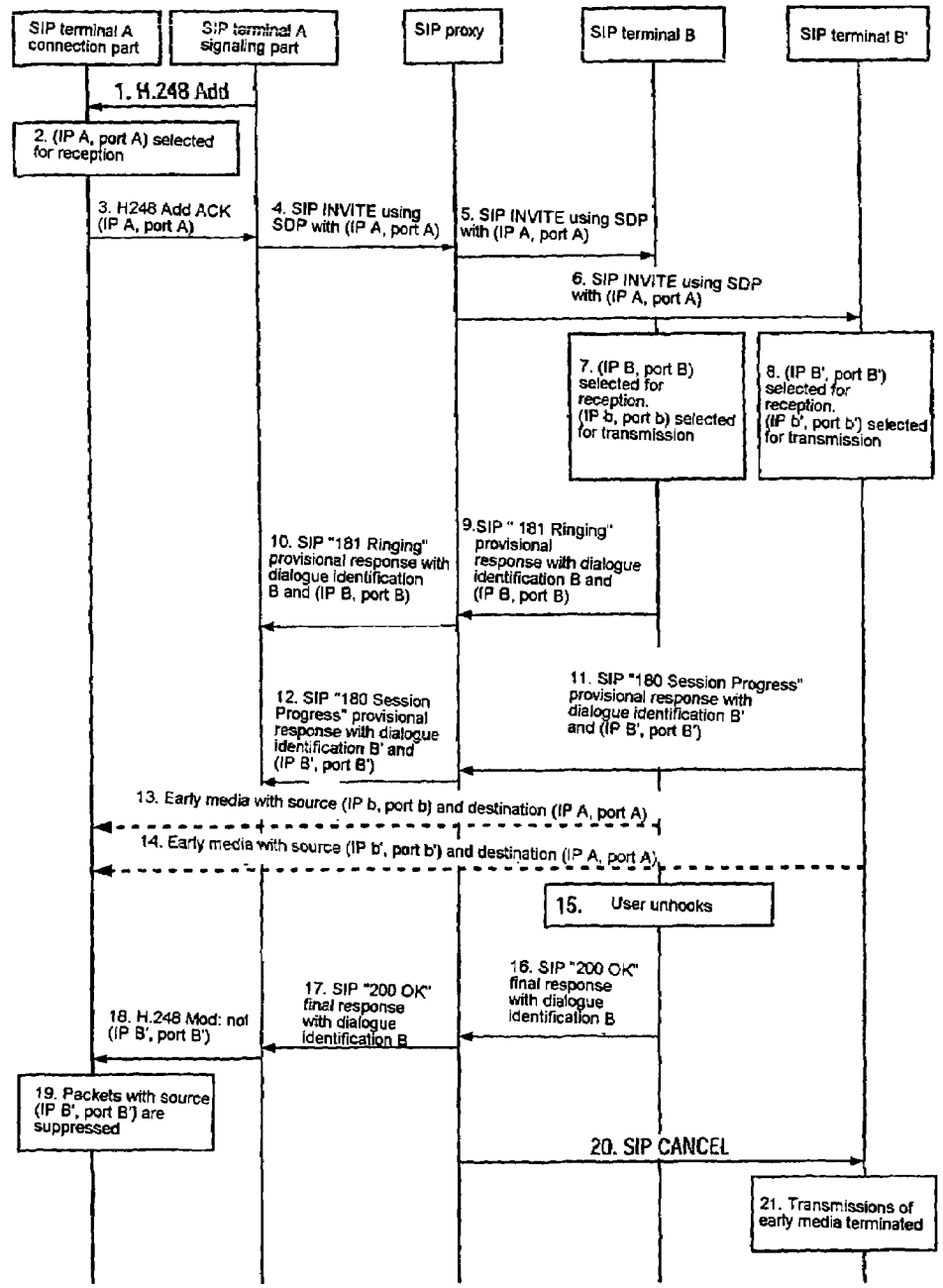

METHOD AND APPARATUS FOR SELECTING USER DATA

CROSS REFERENCE TO RELATED APPLICATIONS

This application is based on and hereby claims priority to PCT Application No. PCT/EP2004/052300 filed on Sep. 24, 2004 and German Application No. 10348208.3 filed on Oct. 16, 2003, the contents of which are hereby incorporated by reference.

BACKGROUND OF THE INVENTION

The invention relates to a method and apparatuses for selecting "early media" user data transmitted via at least one telecommunication network prior to termination of initiation of a call between a calling subscriber terminal and at least one called subscriber terminal.

The Session Initiation Protocol (SIP) is a signaling protocol that can be used for call control, for example, of telephone conversations. SIP is standardized by the IETF in RFC 3261 and in an older version in RFC 2543. To describe the switched communication connection, SIP uses the Session Description Protocol (SDP), IETF RFC 2327, in a manner described in IETF RFC 3264. SIP, together with the negotiated user connections, is usually transmitted using the Internet protocol. SIP is used in the above-described manner in, for example, the Internet Multimedia Subsystem (IMS) of a mobile radio network standardized by 3GPP or 3GPP2.

During initiation of a call from the SIP terminal of a caller A to a called user B, the SIP signaling can be redirected by switching nodes or "proxies". The proxies are permitted to redirect an incoming message which presents a request by the user A for a connection to B (an INVITE request) to a plurality of other proxies or SIP terminals simultaneously or sequentially—for example, in order to search for the user B. Because the last-mentioned proxies can branch the message when redirecting it, a tree-like branching of the message can occur. This branched redirection of messages is referred to in SIP as "forking".

When the INVITE message reaches a terminal of user B, this terminal can respond with what is called a "1xx provisional response" which can serve, for example, to negotiate the media (e.g. speech, video) used for the communication connections and their coding, or to indicate that the user B is being alerted (for example, by the ringing of his SIP telephone). In the event of forking, it can happen that a plurality of terminals send such provisional responses—for example, if a plurality of SIP telephones ring simultaneously. To conclude the initiation of the communication relationship between a terminal of caller A and a terminal of the called party B, the latter terminal responds with what is called a "2xx final response", for example, when user B has unhooked the SIP telephone. A plurality of terminals of B may send such final responses, for example, if a plurality of ringing SIP telephones are unhooked. Accordingly, it can happen that the terminal of A receives provisional responses and/or final responses from a plurality of terminals of B. Each terminal of B provides all the messages it sends as responses to A with the same unique identification. If SIP response messages with a new identification reach the terminal of A, the terminal of A learns from this that it is communicating with a new terminal point. In this case the SIP refers to a "dialogue" existing between the terminal of A and the responding terminal of B. Before A (and/or B, if applicable) has received a final response for a dialogue, this is referred to as an "early dialogue", the subsequent state as an "establish dialogue".

It can happen that before the end of initiation of the communication relationship, the terminals of A and B exchange media (user data) which is referred to as "early media". For example, as in a known telephone network, ring tones and announcements may be transmitted, preferably in the direction from B to A. For a telephone network with SIP signaling, support by an "early media" transmission is especially important if the network is connected to a conventional telephone network.

If a plurality of dialogues are established in (/with) terminal A during initiation of the communication relationship from A to B as a result of forking, A may also receive media (user data), in particular early media, from different terminals B, B'. The terminal of A must represent the media in a suitable fashion. For example, it is possible that different incoming video streams are displayed in separate windows on a display screen. Frequently, however, it is appropriate to select only one incoming media stream and to reject the remaining media streams—for example, because the display screen in a mobile terminal is too small to show a plurality of windows, or because the superposing of different ring tones or announcements would make the content unintelligible.

Information via the corresponding SIP dialogues might be criteria permitting the selection of a suitable media stream (user data stream) for representation:

- If an early dialogue becomes an established dialogue through receipt of the first SIP final response, it is appropriate to select the corresponding media stream.
- It may be appropriate to select the early media that corresponds to the early dialogue last established. This is especially the case if the proxies initiate forking in a sequential manner. If a terminal sends a negative response, or if after a given time the communication relationship with it has not been established, for example, because no user has "unhooked", a proxy redirects the INVITE request to a different terminal. The IETF SIP WG is in the process of specifying methods which will enable terminal A to request a proxy to search only sequentially (draft-ietf-sip-callerprefs).
- Terminal A can terminate dialogues using SIP signaling—for example, because it is able to support only a limited number of dialogues. The corresponding media may, however, continue to be received for a certain time because of the network delay times of signaling and media. It is desirable to suppress the media during this transition time.

The information contained in SIP and SDP does not always unambiguously allow a SIP dialogue to be correlated with the corresponding media stream. In particular, the terminal of caller A selects an IP address and port, for example, a UDP port (see IETF RFC 768), to receive the media streams before it sends the INVITE request containing this information. All incoming media are therefore received at the same IP address and the same port. They can be distinguished by the parameters "source IP address" in the IP header and "source port" in the UDP header of the packets received, i.e. the IP address and the port from which the packets were sent. However, according to RFC 3264, no information on this source IP address and source port is contained in SIP/SDP, but only on the destination IP address and the destination port, i.e. the IP address and port to which the packets were sent.

When SIP forking was designed, the interaction with early media was at first not considered, since early media occur in a SIP network only in special cases, for example, in conjunction with a conventional telephone network.

The handling of early media (user data) in the case of forking is currently being discussed in the IETF SIPPING Working Group. The "draft-camarillo-sipping-early-media" draft proposes that separate communication connections for early media user data be negotiated using SIP, terminal B acting as caller in the communication connections for early media when it receives a call from A for the actual user connection and initially enters into an early dialogue regarding this call for the user connection with A. However, this has the disadvantage that considerably more SIP messages must be exchanged, leading to delay in initiating the call and higher resource demand, especially when transmitting via an air interface with narrow bandwidth. In addition, it might possibly be necessary to reserve separate transmission resources for early media and for the actual user connection.

In the "draft-ietf-mmusic-sdp-srcfilter" the IETF MMUSIC Working Group proposes to introduce into SDP a parameter which allows expression of the source IP address and the source UDP port from which a recipient wishes to receive packets. This information is useful in configuring interposed firewalls. However, the use of this parameter in H.248 signaling has not so far been described.

SUMMARY OF THE INVENTION

It is one possible object of the present invention to make it possible for a SIP terminal of a caller (calling subscriber terminal A) to select media streams (early media user data) as efficiently as possible (in particular for further processing or rejection of said media streams).

It is made possible for the SIP terminal of the caller A to establish a correlation between SIP dialogues (responses) and media streams (early media user data) in order to select appropriate media streams. The inventor proposes to use a called subscriber reception address (IP address/port number) communicated by the destination (B/B') to the calling subscriber (A), for example in a SIP provisional response message or a SIP final response message, for the selection of media stream data (early media user data) received by the calling subscriber (A) (and sent by the called subscriber (B))—it being assumed that the called subscriber reception address signaled by SIP (or by protocols transported by SIP, for example SDP), and the transmission address (IP source address and, for example, UDP source port) of a destination (B) specified in the packets of the media streams received by A, are the same—makes possible simple and efficient selection of media stream data. Although it is theoretically possible that subscriber B uses different IP addresses and/or different ports for sending and receiving media streams which belong together, experience has shown that B very frequently uses the same IP address and the same port for these purposes. The use of the called subscriber reception address from the SIP/SDP signaling is especially suitable for selecting media streams which must be suppressed. It is thereby avoided that A erroneously suppresses media streams when B is using different IP addresses and/or ports for sending and receiving. In this case A is always at least in a position to represent the "correct" media stream if it is the only one received. For example, upon receiving a SIP final response, A may receive a plurality of media streams during a transition time, but the media streams corresponding to the remaining SIP early dialogues will generally be terminated after some time.

Contrary to the current standardization document IETF SIPPING "draft-camarillo-sipping-early-media" (for negotiating separate communication connections for early media data using SIP), the proposed procedure is very efficient with regard to the number of SIP messages that must be transmitted via an air interface and to the lesser changes to terminals that are required.

The called subscriber reception address data taken into account for selection usefully contains an IP address and port number of the called subscriber (terminal B).

The fact that called subscriber reception address data (IP B, port B) of a called subscriber (B) also represents called subscriber transmission address data (IP b, port b) of this called subscriber (B) can mean, in particular, that they are the same (IP B=IP b, port B=port b) or are the same apart from extensions. It can also be advantageous to consider only the IP address but not the port, or even to consider only a Ipv6 address prefix. Thus, it is ensured for a mobile 3GPP terminal (referred to as user equipment (UE) in 3GPP TS 23.060) that it uses only IP addresses having the same IPv6 address prefix.

BRIEF DESCRIPTION OF THE DRAWINGS

These and other objects and advantages of the present invention will become more apparent and more readily appreciated from the following description of the preferred embodiments, taken in conjunction with the accompanying drawing of which:

FIG. 1 represents schematically the signaling during initiation of SIP connections and transmission of early-media media stream data.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

Cellular mobile radio networks (such as GSM, 3G CDMA2000, TDSCDMA, etc.) and fixed networks, and associated terminals and signaling procedures (SIP, SDP), are known per se to those skilled in the art (see, for example, specifications at www.3gpp.org).

FIG. 1 shows a calling subscriber A, including a SIP terminal A connection part and a SIP terminal A signaling part, which communicates via a mobile radio network (represented here only by a SIP proxy necessary for an understanding of the process) with a called subscriber (=B) including a SIP terminal B, and a called subscriber (=B') including a SIP terminal B', using a SIP protocol to initiate a user data connection. The SIP terminal A connection part may be, for example, a so-called "IM-MGW" and the SIP terminal A signaling part may be a so-called "MGCF", the SIP proxy may be a so-called "S-CSCF" and the SIP terminals B and B' may be so-called "UE"s. For simplicity a plurality of SIP messages, for example, "100 Trying", PRACK and 200 OK (PRACK) have been omitted. In the example illustrated, following a message 1 from the SIP terminal A signaling part to the SIP terminal A connection part, initiation of a telecommunication connection (for example, for a speech connection or other user data connection) is attempted, the messages 3-7, 9, 10, 13 being exchanged between the calling subscriber A and the called subscriber B (via the signaling network via the SIP proxy) before unhooking (step 15) by the called user B at the called subscriber terminal B. The SIP terminal A connection part selects the address to be used by the SIP terminal A for future reception (IP address of A (IP A) and port number of A (port A)), transfers these in step 3 to the SIP A signaling part which, in step 4, sends a SIP INVITE message specifying the terminal A reception address (IP A, port A) to a SIP proxy of a telecommunication network (for example, of a cellular mobile radio network) which applies SIP forking and, in steps 5 and 6, transmits this SIP INVITE message to the called subscriber B terminal (SIP terminal B) and to the called subscriber B' terminal (SIP terminal B'), whereupon, in step 7, the SIP terminal B selects its called subscriber reception address (IP B, port B) and transmission address (IP b, port b), while in step 8 the SIP terminal B' selects its called subscriber reception address (IP B' and port B') for reception, and its transmission address (IP b' and port b') for transmission. In step 9 the called subscriber reception address (IP B, port B) selected in called subscriber B, together with a unique identification of the dialogue B, is transmitted in a SIP 181 Ringing provisional response message to a SIP proxy of a telecommunication network, which transmits them, together with the called subscriber reception address (IP B, port B), to the calling subscriber (A) in step 10. In addition, in step 11, a SIP 180 Session Progress provisional response message, with the called subscriber reception address (IP B', port B') and the dialogue identification B', is transmitted by the further SIP terminal B' to the SIP proxy, and (in step 12) to the SIP terminal A (the calling subscriber A).

Through the receipt of messages 9 and 11 with different dialogue identifications B and B', the SIP terminal A connection part knows that it is signaling with two terminals B and B', and that at this time both terminals are possibly already transmitting data (=early media data=media stream data) to (IPA, port A), as in steps 13 and 14, from the SIP terminal B or B' to the terminal of the calling subscriber A. As this happens the SIP terminal B (or the further destination and SIP terminal B') specifies a called subscriber transmission address IP b, port b (or IP b', port b'), indicating where the data originates, to enable the calling subscriber A to determine its origin. In addition, the early media data transmitted in steps 13 and 14 also contains a destination address of the calling subscriber which is used for IP routing. Early media data may contain, for example, ring tones, announcements, etc.

If (through forking) calls are redirected to a plurality of telecommunication network switching devices (proxies) and/or SIP terminals (such as B, B') simultaneously or sequentially, and are possibly redirected to further terminals by addressed SIP terminals B, B' and/or proxies, provisional responses and possibly early-media media stream data from many terminals may arrive at terminal A of the calling subscriber, selection among which is optimized simply and efficiently.

This is possible if the called subscriber reception address (IP B, port B) (transmitted in a response) is identical to the called subscriber B transmission address (IP b, port b), and the latter is used for selection, so that early media data (13, 14) with the called subscriber transmission address (IP b, port b) contained therein, received by the calling subscriber terminal A, can be selected simply and efficiently (for further processing or rejection), without major changes to existing equipment. Rejection may take place, for example, if, after a 200-OK final response message has been forwarded by the called subscriber terminal B to the calling subscriber terminal (A) in steps 16, 17, the successful ending of the call initiation is signaled, so that an established dialogue between terminal A and terminal B is then established, whereupon, for example, early media data streams which do not correspond to the established dialogue established with the message 16/17 (and which therefore contain a different subscriber transmission address) can be rejected/suppressed/ignored by the calling subscriber A. The suppression is effected in that media stream data with transmission address (IP b', port b') is ignored. It is assumed in this context that (IP b', port b') and (IP B', port B') are identical, which is very often the case in practice. The SIP terminal A signaling part informs the SIP terminal A connection part in message 17 that media stream data with the transmission address (IP b', port b') must be ignored. For this purpose a new parameter expressing one or more transmission addresses whose packets must be ignored may, for example, be used in message 17. The STP parameter proposed by the IETF MMUSIC Working Group in "draft-ietf-mmusic-sdp-srcfilter", which is transported in SDP within a MOD message of the H.248 protocol, may, for example, be used for this purpose.

If (IP b', port b') and (IP B', port B') are, in fact, identical a so-called "clipping" can thereby be avoided, i.e. a non-existent user connection after initiation of the connection in the signaling has been concluded on the basis of a final response of a SIP terminal B, upon unhooking by the user. The non-existent user connection is produced by further processing of no longer relevant early media data streams of a SIP terminal B' with different transmission addresses IP b', port b'. Otherwise, it would be only upon receipt of a SIP CANCEL message (step 20) from the SDP proxy to the further SIP terminal (B'), for example, that (only) this SIP terminal B' would stop transmitting early media data streams, and the clipping could continue to exist in a transition period for as long as terminal A was still receiving this early media data. If (IP b, port b) and (IP B, port B) are not identical, the media stream is nevertheless represented by SIP terminals B. If, however, after receipt of the 200-OK final response message 17, SIP terminal A only accepted messages from (IP b, port b), the "correct" media stream would be suppressed, possibly even after no other early media, for example from terminal B', were received.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for selecting user data transmitted via a telecommunication network including at least a terminal associated with a calling subscriber and one or more terminals associated with each of a plurality of called subscribers, the user data being transmitted in response to a calling subscriber initiating a call to at least one called subscriber, comprising:
   sending an invite from the calling subscriber to a called subscriber and at least one other called subscriber;
   receiving the invite at the called subscriber and the at least one other called subscriber;
   sending early media data to the calling subscriber from the called subscriber and the at least one other called subscriber, the early media data sent from the called subscriber including reception address data of the called subscriber that includes an IP address of the called subscriber and a port of the called subscriber, the early media data sent from the at least one other called subscriber including reception address data of the at least one other subscriber that includes an IP address of the at least one other called subscriber and a port of the at least one other called subscriber;
   using, by the calling subscriber, the early media data of the called subscriber and the at least one other called subscriber to select user data, which is sent by the called subscriber along with transmission address data of the called subscriber that includes an IP address of the called subscriber and a port of the called subscriber, wherein the reception address data of called subscriber is identical to the transmission address data of the called subscriber.

2. The method as claimed in claim 1, wherein selection is effected by rejection of media stream packets having certain transmission addresses.

3. The method as claimed in claim 1, wherein
selection is made by rejecting user data packets received from one or more transmission addresses, and
the one or more transmission addresses from which user data packets are rejected are transmitted between an SIP terminal signaling part associated with the called subscriber and an SIP terminal connection part associated with the calling subscriber.

4. The method as claimed in claim 3, wherein
each transmission address specifies a source internet protocol (IP) address and a source user datagram protocol (UDP) port, and
a Session Description Protocol (SDP) parameter defined by the Internet Engineering Task Force (IETF) MMUSIC Working Group in the "draft-ietf-mmusic-sdp-src-filter" is used to specify the source IP address and the source UDP port.

5. The method as claimed in claim 1, wherein
the reception address data is derived from a Session Initiation Protocol (SIP) provisional response message or a SIP final response message, sent by the called subscriber to the calling subscriber.

6. The method as claimed in claim 1, wherein
after the calling subscriber is connected to the called subscriber, the called subscriber stops transmitting user data and initiation is ended, and
clipping at the end of initiation is avoided by rejecting user data received after the called subscriber is connected.

7. The method as claimed in claim 1, wherein
in the selection of user data, early media user data of a called subscriber is rejected upon receipt of a session initiation protocol (SIP) final response message by the calling subscriber if said early media user data belongs to an early media user data stream other than a media stream for the SIP final response message.

8. The method as claimed in claim 1, wherein
early media user data sent by the called subscriber is selected, and
upon receipt of a new early media user data stream through receipt of a message from the called subscriber, presenting the reception address data for the called subscriber, early media user data from data streams presented prior to the new early media user data stream is rejected.

9. The method as claimed in claim 1, wherein
as soon as the calling subscriber sends a message to the called subscriber to terminate a Session Initiation Protocol (SIP) dialogue, the calling subscriber rejects early media data received from the called subscriber having the reception address of said called subscriber.

10. The method as claimed in claim 1, wherein selection is effected by rejection of media stream packets having certain transmission addresses.

11. The method as claimed in claim 10, wherein
selection is made by rejecting user data packets received from one or more transmission addresses, and
the one or more transmission addresses from which user data packets are rejected are transmitted between an SIP terminal signaling part associated with the called subscriber and an SIP terminal connection part associated with the calling subscriber.

12. The method as claimed in claim 11, wherein
each transmission address specifies a source internet protocol (IP) address and a source user datagram protocol (UDP) port, and
a Session Description Protocol (SDP) parameter defined by the Internet Engineering Task Force (IETF) MMUSIC Working Group in the "draft-ietf-mmusic-sdp-src-filter" is used to specify the source IP address and the source UDP port.

13. The method as claimed in claim 12, wherein,
the reception address data is derived from a Session Initiation Protocol (SIP) provisional response message or a SIP final response message, sent by the called subscriber to the calling subscriber.

* * * * *